United States Patent [19]
Baker et al.

[11] 4,184,743
[45] Jan. 22, 1980

[54] FIBRE-OPTIC CABLE

[75] Inventors: Peter D. Baker, Basingstoke; Douglas V. Luke, Farnham Common, both of England

[73] Assignee: Smiths Industries Limited, London, England

[21] Appl. No.: 875,839

[22] Filed: Feb. 7, 1978

[30] Foreign Application Priority Data

Feb. 8, 1977 [GB] United Kingdom ............. 5213/77

[51] Int. Cl.² ............................................. G02B 5/16
[52] U.S. Cl. ................................. 350/96.23; 350/96.26
[58] Field of Search ............... 350/96.23, 96.26, 96.10, 350/63; 362/32; 250/227

[56] References Cited
U.S. PATENT DOCUMENTS

| 3,498,286 | 3/1970 | Polanyi et al. ............... 350/96.23 |
| 3,699,950 | 10/1972 | Humphrey, Jr. et al. ........ 350/96.23 |
| 3,855,897 | 12/1974 | Takahashi et al. ............ 350/96.26 |

FOREIGN PATENT DOCUMENTS 1438074  6/1976  United Kingdom ............... 350/96.23

*Primary Examiner*—Stewart J. Levy
*Attorney, Agent, or Firm*—Pollock, Vande Sande & Priddy

[57] ABSTRACT

A fibre-optic cable has a bundle of glass-fibre or silica-fibre strands extending along its length, each end of the fibre-bundle being sealed in a metal ferrule. A sheath of woven glass-fibre or silica-fibre extends about the fibre-bundle and is secured at each end to a respective ferrule in tension, such that the sheath is constricted onto the fibre-bundle along its length. The cable has an outer convoluted metal shell which is sealed at each end to a respective ferrule. A sleeve of elastic material extends around the fibre-bundle and the sheath, within the outer shell, and serves to support and cushion the fibre-bundle along its length. The sleeve may be of a woven fibre including glass-fibre or silica-fibre, and asbestos-fibre, or the sleeve may be of an elastomeric substance. A metal braid sleeve covers the outer surface of the convoluted metal shell. The cable may be included in a radiation pyrometer to transmit radiation to a radiation sensor.

10 Claims, 2 Drawing Figures

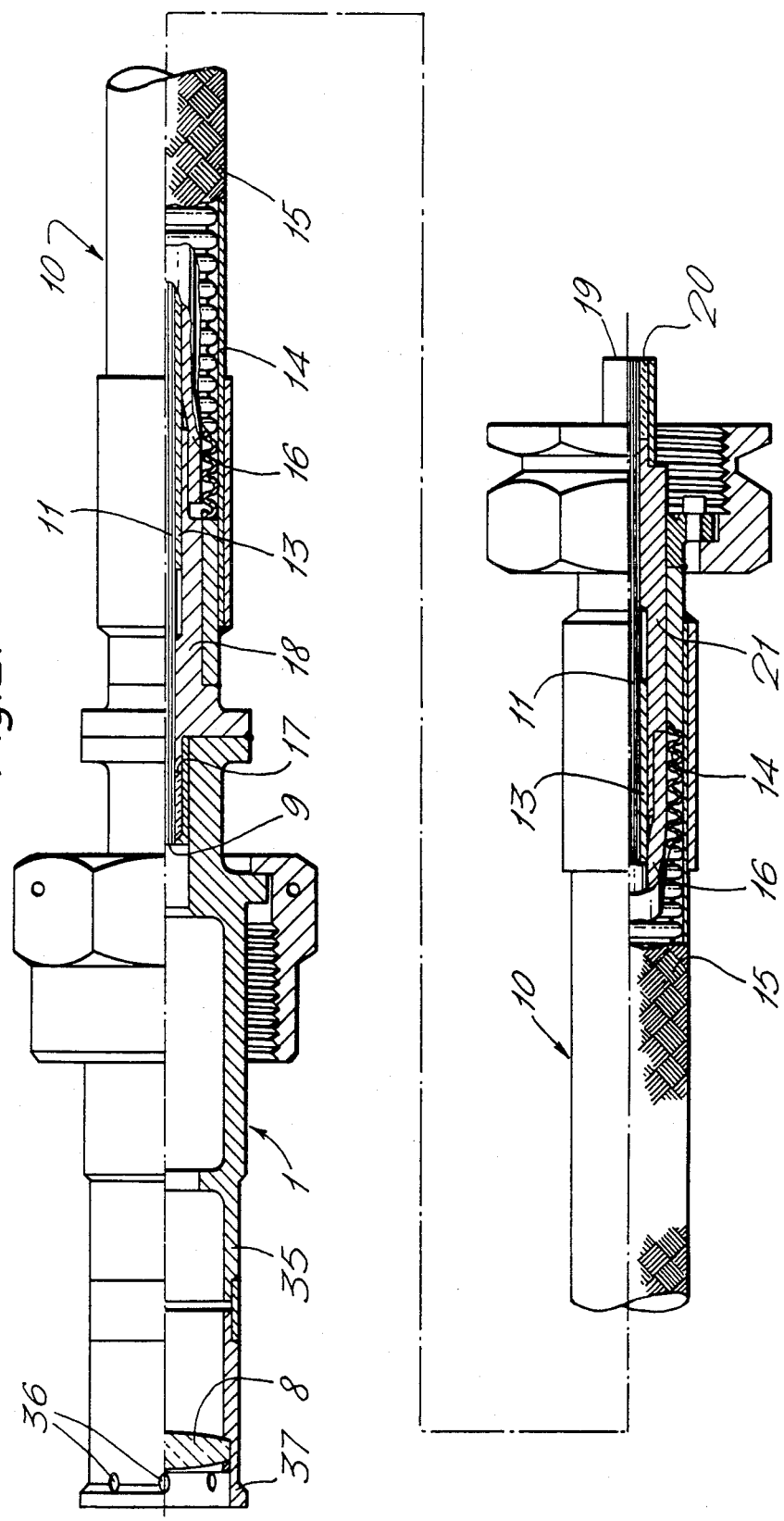

FIBRE-OPTIC CABLE

BACKGROUND OF THE INVENTION

This invention relates to fibre-optic cable.

The invention is concerned especially with fibre-optic cable of the kind having a bundle of glass-fibre or silica-fibre strands arranged to transmit radiation along the length of the cable. The invention is more particularly concerned with fibre-optic cable that is adapted for use in an environment where it would in normal events be subject to stress that might fracture or otherwise damage the cable and thereby interfere with light-signal transmission along it. Such circumstances may arise, for example, where the cable is used on an engine.

BRIEF SUMMARY OF THE INVENTION

It is an object of the present invention to provide an improved form of fibre-optic cable that is less susceptible to damage under stress.

According to one aspect of the present invention there is provided a fibre-optic cable including a fibre-bundle wherein the fibre-bundle is enclosed tightly within a woven-fibre sheath.

The sheath may, for example, be of glass-fibre or silica-fibre. The fibre-bundle may be terminated at an end within a closely-fitting ferrule and in these circumstances the sheath may extend the length of the cable between two ferrules, being secured to the ferrules in tension so as to be constricted onto the bundle along its length.

According to another aspect of the present invention there is provided a fibre-optic cable having an outer metal shell and a fibre-bundle extending within the shell, wherein the fibre-bundle is supported and cushioned within the shell by a filling of elastic material. In this respect the filling may be a sleeve of a woven-fibre material such as glass-fibre or silica-fibre, or silica-fibre and asbestos-fibre. Alternatively the sleeve may be of an elastomeric substance (for example, silicone, fluoro-silicone or fluoro-carbon rubber).

The outer metal shell may be provided by, or include, convoluted metal tubing.

The sheath tightly constricts the bundle preventing damage such as might otherwise be caused by, for example, vibration, and also permits individual fibres to slide over one another along their length upon flexing of the cable. Where the cable includes ferrules, the sheath helps relieve stress in the region the fibre-bundle enters each ferrule. The filling of elastic material protects the fibres of the fibre-bundle from shock and ensures good mechanical damping, whilst the outer shell protects the fibre-bundle from external pressure.

A fibre-optic cable in accordance with the present invention and as incorporated in a radiation pyrometer installed in a gas-turbine engine, will now be described by way of example, with reference to the accompanying drawings:

BRIEF DESCRIPTION OF THE DRAWINGS

FIG. 2 is a sectional elevation of the radiation pyrometer.

DETAILED DESCRIPTION

Figure 1:
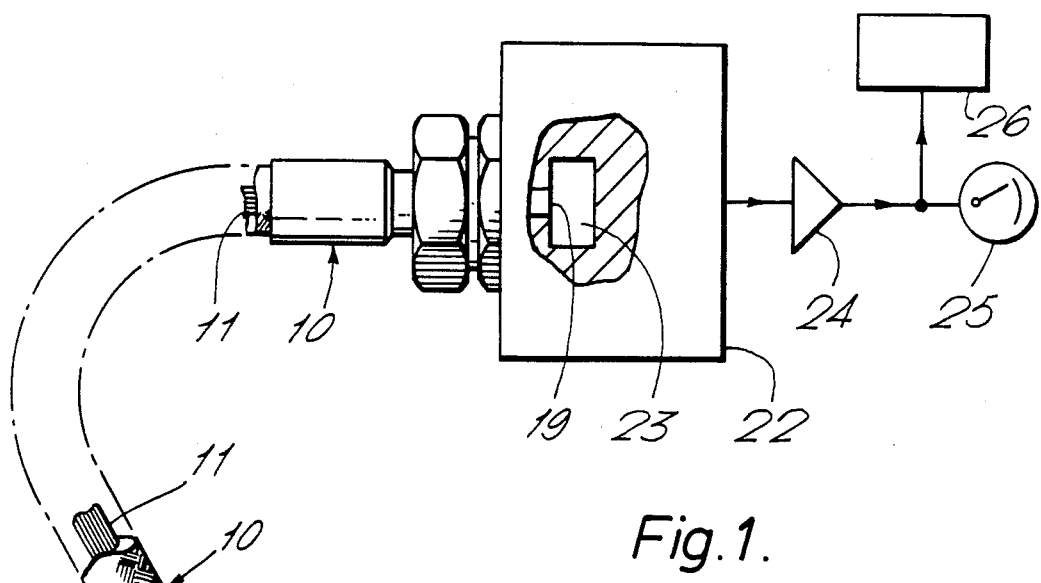
FIG. 1 illustrates the installation in the engine.
Figure 1:
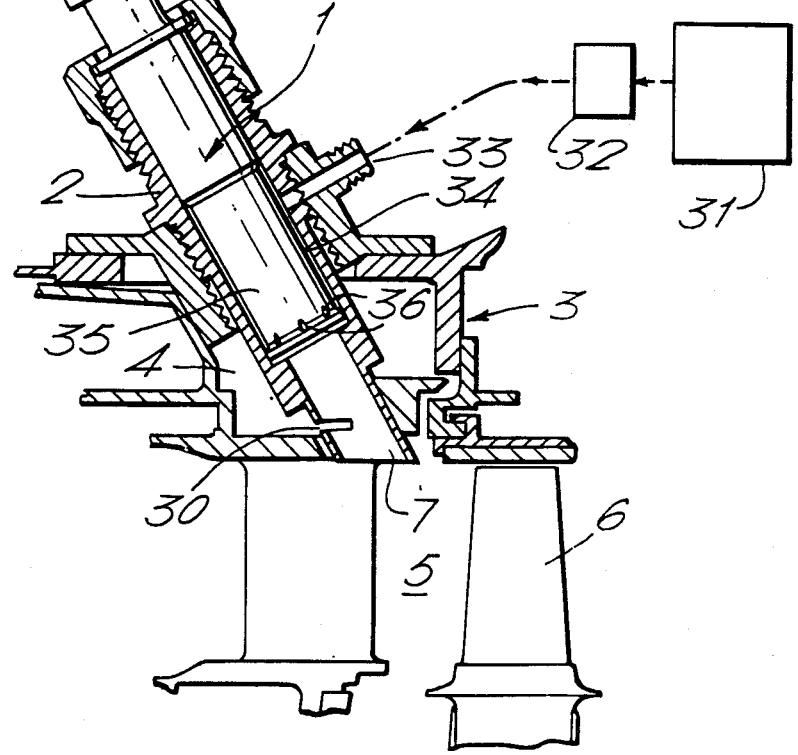

Referring more especially to FIG. 1, the radiation pyrometer has an optical head 1 that is enclosed by a metal sleeve 2 mounted on the turbine casing 3 of the engine. The sleeve 2 extends through the engine by-pass duct 4 to the turbine chamber 5 for directing the head 1 towards the turbine blades 6. More particularly, the sleeve 2 incorporates a sighting tube 7 that opens into the chamber 5 from the duct 4 and serves to channel radiation from the blades 6 to a synthetic-sapphire lens 8 (FIG. 2) in the head 1.

Referring now more especially to FIG. 2, the lens 8 focusses radiation received from the blades 6 onto the end 9 of a fibre-optic cable 10. The fibre-optic cable 10 includes a bundle 11 of glass-fibre or silica-fibre strands contained within a sheath 13 of woven glass-fibre or silica-fibre and is protected externally by stainless-steel convoluted tubing 14 and stainless-steel braid 15. The sheathed bundle 11 is cushioned and supported within the tubing 14 by an elastic sleeve 16 formed by a double thickness of an open-weave fibre material. The fibre material may be of glass or silica, or may be a mixture of silica-fibre and asbestos-fibre such as is sold, for example, under the name Refrasil by the Chemical and Insulating Company Limited, Darlington, England. Alternatively, in low-temperature applications, the sleeve 16 could be of an elastomeric substance such as, for example, silicone, fluoro-silicone or fluoro-carbon rubber and several sleeves could be provided coaxially of one another. The end 9 of the bundle 11 is enclosed by a glass tube 17 and is sealed hermetically into a metal ferrule 18 that serves to couple the cable 10 to the head 1. The opposite end 19 of the the cable 10 is similarly hermetically sealed, being enclosed by a glass tube 20 within a metal ferrule 21.

Referring again to FIG. 1, the end 19 of the cable 10 is coupled into a detector unit 22 mounted at a comparatively-cool location on the engine. The unit 22 includes a photoresponsive element 23 that serves to convert the optical signal transmitted via the cable 10 to the end 19 into an electrical signal. This electrical signal provides a measure of turbine-blade temperature and is supplied via an amplifier 24 to both an indicator 25 and and engine-control unit 26.

The accuracy of the electrical signal as a measure of turbine-blade temperature depends on the integrity of the optical signal derived by the head 1. Such integrity is much influenced by any attenuation of the radiation received by the head 1, caused by fouling of the front, exposed surface of the lens 8 with fuel and combustion products within the sighting tube 7. Provision is accordingly made to purge fuel and combustion products from the tube 7 during running of the engine, and in this respect the tube 7 has a slot 30 that opens into the by-pass duct 4. Cooling air as conventionally supplied to the duct 4 from the compressor stage of the engine, flows through the slot 30 into the tube 7 to be exhausted into the chamber 5 so as to block to a substantial extent entry of fuel and combustion products into the tube 7 during running.

The pressure of the cooling air supplied to the duct 4 is however low during starting of the engine and is in general insufficient to ensure that fuel-air mixture does not enter the tube 7 at this time. To block entry of the fuel-air mixture in these conditions, purging air is supplied from a separate source 31.

The air-supply source 31 is coupled via a non-return valve 32 to an inlet 33 on the sleeve 2 to pass low-pressure air (for example, at 80 pounds per square inch) into an annular space 34 between the sleeve 2 and the casing 35 of the head 1. This air is vented from the space 34 across the front surface of the lens 8 into the tube 7 via circumferentially-distributed ports 36 in a lens-retaining ring 37 (FIG. 2) of the casing 35. The flow of air across the lens 8 into the tube 7 purges the tube 7 free from the fuel-air mixture, and continues as starting proceeds, until the pressure applied to the inlet 33 is exceeded by that in the by-pass duct 4. Air which now flows through the slot 30 from the duct 4 to maintain purging of the tube 7, creates a curtain trapping the volume of clean and virtually stagnant air remaining adjacent the lens 8, above the slot 30. The slot 30 is inclined forwardly to direct flow downwardly of the tube 7 and thereby enhance the curtain effect.

With the installation described above there is the advantage that the tube 7 is purged adequately from the very beginning of engine operation, thereby minimizing fouling of the lens 8. In this respect it is of especial significance that an adequate purging of the tube 7 is effective during starting to inhibit entry of fuel-air mixture, since any such mixture which might be inadequately purged subsequently would be initially oxidized and then partially reduced as the environmental temperature increases, to form a fine-particle deposit on, in particular the lens 8.

The air-supply source 31 may be an air-bottle or other reservoir that is mounted with the engine and is coupled to a pump to be replenished during engine running. Sources of other gases could be used to provide the initial purging of the tube 7.

The construction of cable 10 involving the sheath 13 of woven fibre has advantage in relieving stress at the ferrules 18 and 21. Furthermore, the sheath 14 when tensioned acts as a braid tube in constricting the bundle 11 tightly. The cushioning of the sheathed bundle 11 provided by the sleeve 16 protects the glass fibres of the bundle 11 from shock and ensures good mechanical damping. The convoluted tubing 14 provides rigidity about its diameter to protect the fibre-bundle 11 from external pressures whilst it also enables the cable 10 to be flexed about its length.

We claim:

1. A fibre-optic cable including an optical fibre-bundle for transmission of radiation along its length; a first ferrule and a second ferrule, one end of said fibre-bundle being fitted within said first ferrule, the other end of said fibre-bundle being fitted within said second ferrule; and a permeable sheath of an open-weave fibre material, said sheath surrounding and contacting said fibre-bundle along a major part of its length, and said sheath being secured at both ends to respective ferrules in tension such that said sheath is constricted onto said fibre-bundle so as tightly to enclose said fibre-bundle, including an outer metal shell, said fibre-bundle extending within said shell, wherein said shell is sealed at one end to said first ferrule and at the other end to said second ferrule so as to enclose said fibre-bundle along its length.

2. A fibre-optic cable according to claim 1, wherein said sheath is of a fibre of a substance in a class consisting of glass and silica.

3. A fibre-optic cable according to claim 1 including a filling of elastic material within said shell between said sheath and said shell so as to support and cushion said fibre-bundle within said shell.

4. A fibre-optic cable according to claim 3 wherein said filling of elastic material is a sleeve of woven fibre, said fibre including a substance in a class consisting of glass and silica.

5. A fibre-optic cable according to claim 4 wherein said sleeve is of a woven fibre including asbestos-fibre.

6. A fibre-optic cable according to claim 3 wherein said filling of elastic material is a sleeve of an elastomeric substance.

7. A fibre-optic cable according to claims 1, 4, 5, 6, or 3 wherein said outer metal shell is formed with convolutions about its circumference.

8. A fibre-optic cable according to claim 7 including a sleeve of metal braid, said sleeve covering the outer surface of said metal shell.

9. A fibre-optic cable comprising:
an outer metal shell;
an optical fibre-bundle for transmission of radiation along its length, said fibre-bundle extending within said shell;
a first ferrule and a second ferrule, one end of said fibre-bundle being fitted within said first ferrule, the other end of said fibre-bundle being fitted within said second ferrule,
a permeable sheath of open weave fibre material, said sheath surrounding and contacting said fibre-bundle along a major part of its length, and said sheath being secured at both ends to respective ferrules in tension such that said sheath is constricted at said fibre-bundle so as to tightly enclose said fibre-bundle; and
a sleeve of elastic material, said sleeve extending within said shell around said fibre-bundle and said sheath, so as to support and cushion said fibre-bundle within said shell.

10. A fibre-optic cable assembly comprising a radiation sensor, a fibre-optic cable, and means coupling said cable to said sensor so that radiation is transmitted by said cable to said sensor, wherein said cable comprises:
an outer metal shell;
an optical fibre-bundle for transmission of radiation along its length, said fibre-bundle extending within said shell;
a first ferrule and a second ferrule, one end of said fibre-bundle being fitted within said first ferrule, the other end of said fibre-bundle being fitted within said second ferrule;
a permeable sheath of open-weave fibre material, said sheath surrounding and contacting said fibre-bundle along a major part of its length, and said sheath being seamed at both ends to respective ferrules in tension such that said sheath is constricted onto said fibre-bundle so as to tightly enclose said fibre bundle;
and a sleeve of elastic material, said sleeve extending within said shell around said fibre-bundle and said sheath so as to support and cushion said fibre-bundle within said shell.